F. S. CARR.
FASTENER.
APPLICATION FILED JULY 14, 1919.

1,376,001.

Patented Apr. 26, 1921.

Inventor:
Fred S. Carr,
by Emery, Booth, Janney & Varney
Attys.

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

1,376,001.  Specification of Letters Patent.  Patented Apr. 26, 1921.

Application filed July 14, 1919. Serial No. 310,592.

*To all whom it may concern:*

Be it known that I, FRED S. CARR, a citizen of the United States, and a resident of Newton, in the county of Middlesex and State of Massachusetts, have invented an Improvement in Fasteners, of which the following description, in connection with the accompanying drawings, is a specification, like characters on the drawings representing like parts.

This invention relates to stud and socket fasteners and the object is to provide an improved fastener of this type adaptable, although not necessarily limited, to the heavier sort of work such as the fastening of automobile curtains. In the particular embodiment of the invention herein disclosed the fastener is of the type wherein the resiliency resides in the stud and provision is furthermore made whereby the fastener will open from but one side. In other words, the fastener is of the three-side lock type.

My invention will best be understood by reference to the following description taken in connection with the illustrative embodiment thereof shown in the accompanying drawings wherein.

Figure 1:
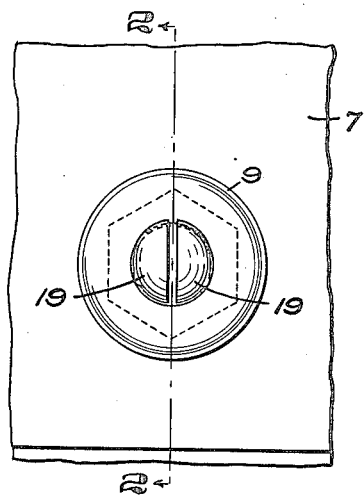
Figure 1 is a front elevation of a fastener embodying my invention.

Referring to the drawings and particularly to the form shown in Fig. 1, I have there shown my invention as applied to a fastener having the male member secured to a fixed support 5, for example the body or frame of an automobile, and the female member or socket secured to a member which may be readily flexible, such as the curtain 7 of an automobile and which is to be fastened to the support 5. The socket member which is secured to the curtain 7 is of ring-like form and may be a simple eyelet or gromet 9, preferably circular as shown in Fig. 1.

The stud which coöperates with the gromet 9 may conveniently be formed integrally from a single piece of resilient sheet metal as herein shown, the stud comprising a hollow body having a base portion 11 turned over the head of a screw 13 by which it may be secured to the support 5. Obviously, however, the particular manner in which the stud is secured in position is not of the essence of the invention which is more particularly concerned with the construction of the stud itself. In the example shown the stud comprises a hollow, substantially cylindrical shank 15 which may, as in the present instance, be cylindrical in the narrower sense of a right circular cylinder. The stud is terminally offset in the direction of strain (upwardly in the figures) to form a head providing an abrupt shoulder 17 from which the end of the stud leads in a smooth curve, without projections or shoulders, across the end and to the base portion 11 as clearly shown in Fig. 2. The metal forming the head of the stud may also conveniently be pressed slightly outwardly at the sides, as indicated at 19, to form rounded lateral shoulders.

To provide resiliency in the stud, the latter may be provided with a slit 21 extending from the point of the shoulder 17 across the end of the stud and along the lower side thereof to the base 11. A stud constructed in this way has at its upper side a rigid hook-like portion having a straight base 16 parallel to the axis of the stud and a point provided by the abrupt shoulder 17. The straight bottom portion of this hook constitutes a spring hinge about which the lateral portions of the stud may yield laterally, that is, in a substantially horizontal direction viewing Fig. 1. It will be understood that if the stud at the rear of the shoulder 17 were not straight in this manner, this yielding action could not be obtained. At the same time the stud is substantially rigid vertically, the two opposed portions thereof taking the strain in that direction being generally channel-shaped. The portion of the stud directly opposite the straight bottom portion 16 is preferably, as best shown in Fig. 2, substantially parallel with the straight-bottom portion 16.

Figure 2:
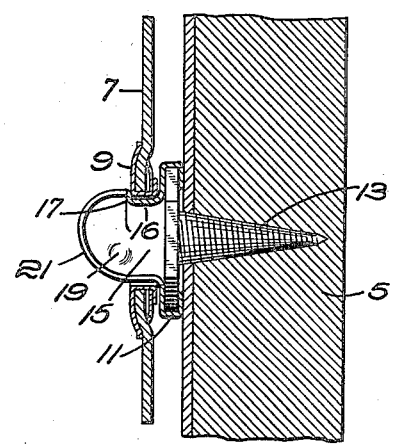
Fig. 2 is a section on the line 2—2 of Fig. 1.

Referring to Fig. 2, it will be understood that the stud is assembled on the work with the shoulder portion projecting in the direction of the strain which comes on the curtain or other device 7; and the parts of the fastener are assembled by presenting the eyelet 9 in a somewhat angular position to the stud, hooking the upper portion over behind the shoulder 17 and then swinging it downwardly to the position shown in Fig. 2. The smooth, unshouldered lower surface of the stud permits this action with an eyelet or socket having a diameter substantially that of the shank of the stud. Thus, the eyelet or socket when in position is closely adapted to and fits the shank of the stud and may be held thereon by the lateral resiliency thereof. When, as is preferred, the shoulders 19 are used the eyelet will pass over these shoulders with a snap, their rounded nature permitting the eyelet to displace inwardly the laterally yieldable wing portions of the stud and reach to the position shown in Fig. 2.

The curtain 7 may be released by a reversal of the process of assembly consisting of a tipping pull on the lower edge in Fig. 2; but the stud is positively locked against opening from any other side because of the engagement of the eyelet behind the abrupt shoulder 17.

The eyelet cannot ride over the shoulder because the latter is thus abrupt and because the diameter of the socket is less than the distance from the point of the shoulder to the opposite side of the stud and the resiliency in the stud is in the lateral direction only (horizontal in the figures), the stud being substantially rigid in a vertical direction so that no amount of pull can cause a yielding which would release the eyelet from the shoulder. The usual strain on such a fastener in practice is one exerted on the curtain upwardly viewing Fig. 2. If this strain is to the right, obviously the eyelet 9 seats on the dead metal of the base 11 and there is no tendency for the parts to separate. If it is to the left, the eyelet is supported by the rigid hook and similarly assumes an angular position and jams across the rigid dimension of the stud; and under certain circumstances the eyelet will also seat at its lower end against the base 11. The strain in no instance tends to act on the resilient portions of the fastener in such a way as to compress the stud in a manner which might release the eyelet or socket 9.

I have described in detail the preferred embodiments of my invention shown by way of illustration in the accompanying drawings, but it will be understood that I have done this in order that the particular constructions shown and the manner in which they illustrate the theoretical principles involved might be more readily understood, and not because the exact details are essential to the invention. What I claim as new and desire to secure by Letters Patent I shall express in the following claims:—

1. A stud and socket fastener comprising a ring-like socket or eyelet closely adapted to the stud and a stud terminally extended in the direction of strain to provide a head, said stud being substantially rigid in the line of strain and resilient laterally.

2. A stud and socket fastener comprising a ring-like socket or eyelet closely adapted to the stud and a stud terminally extended in the direction of strain to provide a head, said head being joined to the body of the stud by an abrupt shoulder.

3. A stud and socket fastener comprising a ring-like socket or eyelet closely adapted to the stud and a stud terminally enlarged laterally and extended in the direction of strain, said stud being substantially rigid in the line of strain and resilient laterally.

4. A stud for fasteners having a substantially straight portion having a terminal abrupt shoulder and resilient portions yielding laterally from said straight portion as about a hinge, said portions being substantially incompressible toward said straight portion.

5. A stud for fasteners having a substantially straight portion having a terminal abrupt shoulder and resilient portions yielding laterally from said straight portion as about a hinge and providing rounded lateral socket retaining shoulders, said portions being substantially incompressible toward said straight portion.

6. A stud for fasteners having a substantially straight portion having a terminal abrupt shoulder and resilient portions yielding laterally from said straight portion as about a hinge, said portions being substantially incompressible toward said straight portion and providing an opposed unshouldered eyelet engaging portion substantially parallel to said straight portion.

7. A stud for fasteners having a substantially rigid hook-like portion, wing portions laterally yieldable about the base of the hook and providing an exterior surface smoothly curved from the point of the hook to the base of the stud while providing a smoothly curved outward projection compelling compression of the stud when a close-fitting eyelet is engaged therewith or separated therefrom.

8. A hollow resilient stud for fasteners having a substantially cylindrical shank portion and a head slightly enlarged laterally and extended upwardly to provide a shoulder, said stud being divided across the end of the head and along the lower side of the shank.

9. A stud and socket fastener comprising a ring-like socket or eyelet and a shell-like stud having a shank of minimum diameter at the base and a head extending to one side of said shank to provide a flange or shoulder, the stud being slit from a point adjacent said shoulder along the opposite side of the shank and providing a resilient member snugly to fit the eyelet, the distance from the top of the shoulder to the opposite side of the stud being greater than the corresponding diameter of the eyelet.

10. A hollow sheet metal stud member split longitudinally through one side and crosswise at its outer end or head, the said member having a closed substantially straight back substantially parallel with the longitudinal axis of said stud member and constituting a spring hinge, and having a shoulder at the extremity of said back.

11. A hollow sheet metal stud member split longitudinally through one side and crosswise at its outer end or head, the said member having a closed substantially straight back substantially parallel with the longitudinal axis of said stud member and constituting a spring hinge, the said member being terminally enlarged to provide an abrupt shoulder at the extremity of the back and rounded lateral shoulders.

12. A stud having a rigid side and provided with an offset head providing a shoulder at that side and portions resiliently yieldable laterally about that side as about a hinge.

13. A stud and socket fastener comprising a ring-like socket or eyelet carried by a curtain and closely adapted to fit the stud, and a stud terminally extended in the direction of strain on the curtain to provide a head, said stud being substantially rigid in the line of strain and resilient laterally, said stud and socket separable by an outward strain on that portion of the curtain carrying the eyelet opposite the normal line of strain on the curtain.

In testimony whereof, I have signed my name to this specification.

FRED S. CARR.